J. F. MEADE.
LANDING GEAR FOR AIRCRAFT.
APPLICATION FILED AUG. 21, 1919.

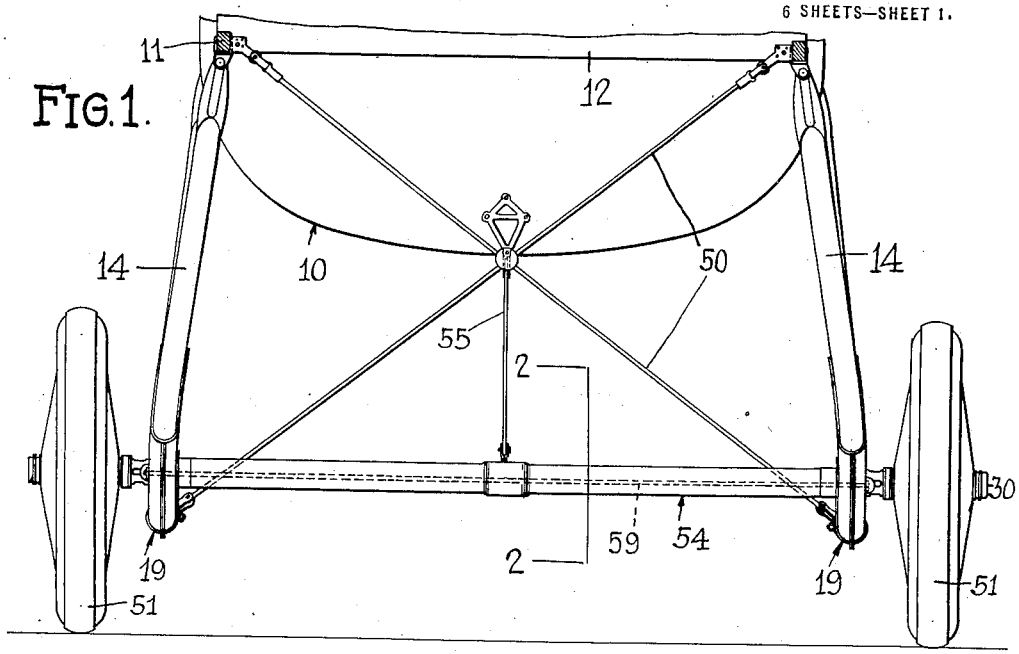
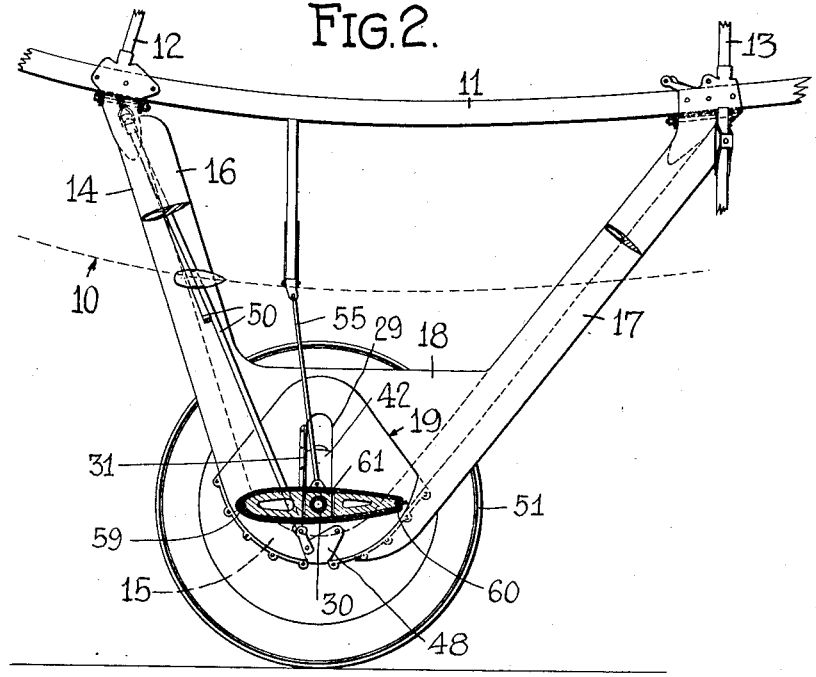

1,406,575.

Patented Feb. 14, 1922.
6 SHEETS—SHEET 2.

INVENTOR
JOSEPH F. MEADE.
BY Chester N. Broughton
ATTORNEY

J. F. MEADE.
LANDING GEAR FOR AIRCRAFT.
APPLICATION FILED AUG. 21, 1919.
1,406,575.
Patented Feb. 14, 1922.
6 SHEETS—SHEET 3.
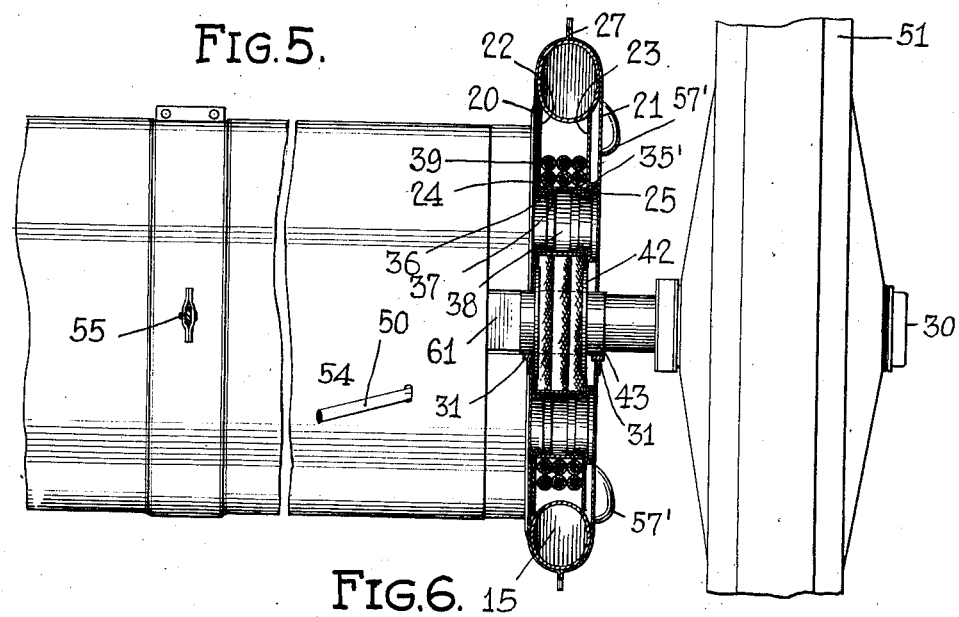
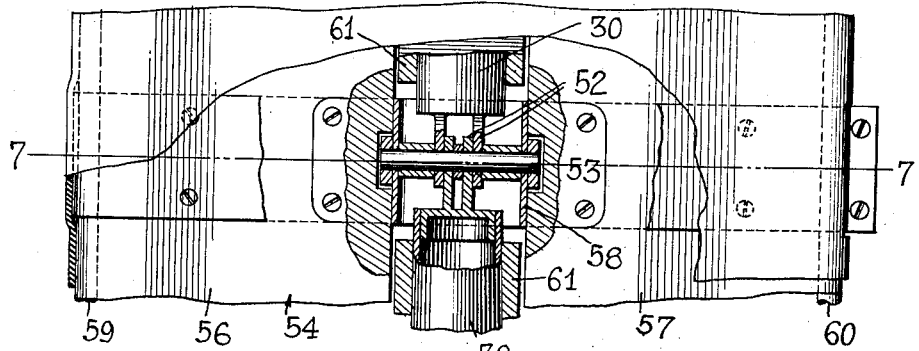
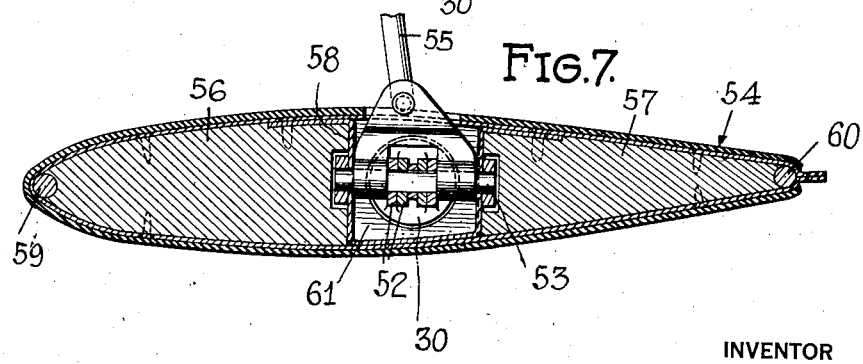
INVENTOR
JOSEPH F. MEADE.
BY Chester N Broulton
ATTORNEY

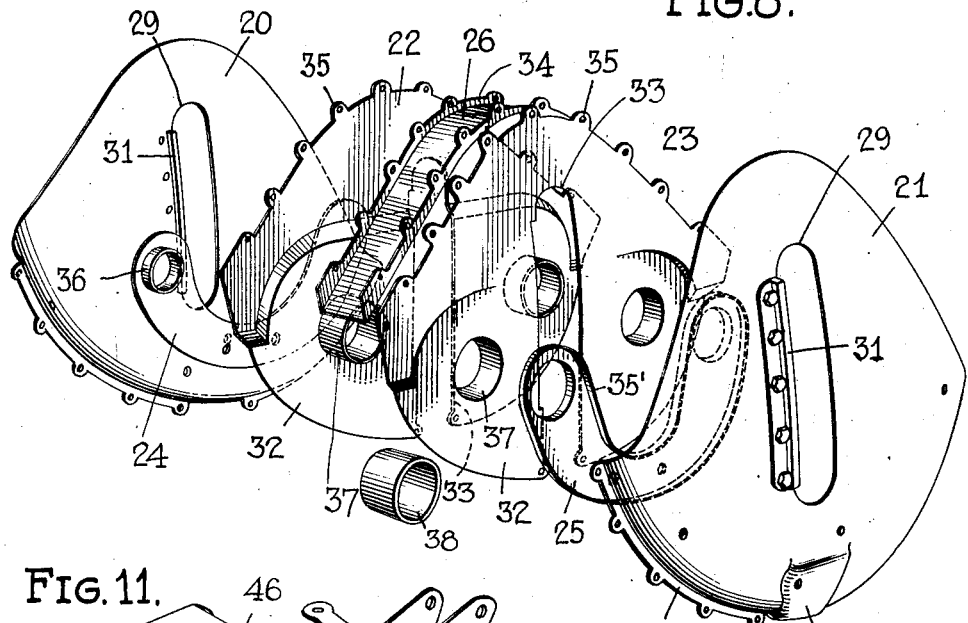
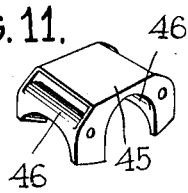
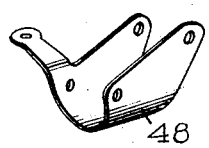
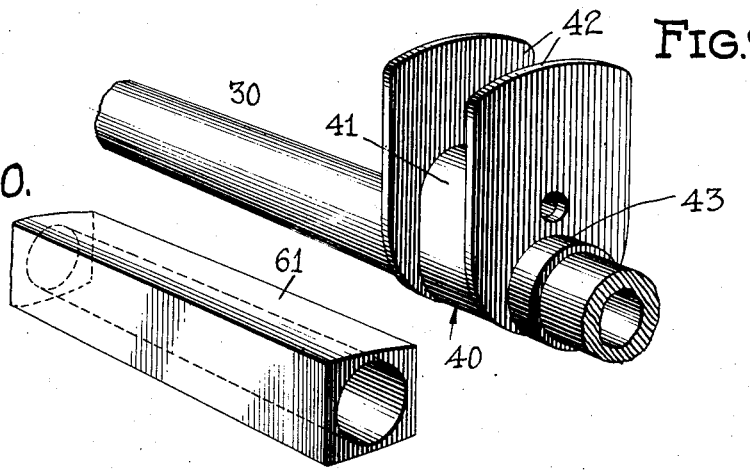

J. F. MEADE.
LANDING GEAR FOR AIRCRAFT.
APPLICATION FILED AUG. 21, 1919.

1,406,575.

Patented Feb. 14, 1922.

Inventor
JOSEPH F. MEADE.

By Attorney

J. F. MEADE.
LANDING GEAR FOR AIRCRAFT.
APPLICATION FILED AUG. 21, 1919.

1,406,575.

Patented Feb. 14, 1922.
6 SHEETS—SHEET 6.

INVENTOR
JOSEPH F. MEADE.
BY
ATTORNEY

UNITED STATES PATENT OFFICE.

JOSEPH F. MEADE, OF ROOSEVELT, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

LANDING GEAR FOR AIRCRAFT.

1,406,575. Specification of Letters Patent. Patented Feb. 14, 1922.

Application filed August 21, 1919. Serial No. 318,876.

*To all whom it may concern:*

Be it known that I, JOSEPH F. MEADE, a citizen of the United States, residing at Roosevelt, in the county of Nassau and State of New York, have invented certain new and useful Improvements in Landing Gears for Aircraft, of which the following is a specification.

My invention relates to landing gears for aircraft and more particularly to landing gears for airplanes as distinguished from lighter-than-air machines.

In using the term "landing gear" herein, I refer not only to that part or portion of the airplane commonly called the "landing gear" but to that part or portion of the airplane specifically designated the "tail skid." "Landing gear" in its broad interpretation embraces all parts or portions of the airplane directly functioning to support it at rest, in landing or in taking off.

A characteristic of the invention is the arrangement of the shock absorbing mechanism wholly between plates fastened to and against opposite faces of the landing gear struts. Thus arranged, the landing gear is stripped of a large number of flight resistant surfaces and the flying speed of the craft increased. Preferably elastic cord is used to yieldingly resist displacement of the landing gear axle, the cord being laced or extended in a fore and aft direction and supported by spools or the like carried jointly by said plates. The spools are held rigidly in place and braced by elements which function also as connections between the plates and struts. To further cut down the head resistance the plates, the spools and the elastic cords are commonly enclosed in housings which are slotted to act as guides for the landing gear axle.

The tail skid portion of the landing gear comprises in addition to the more or less conventional tail skid or skid bar a frame and guide combined. The frame is supported entirely by the fuselage wiring and the skid and for a portion of its length (and also the frame) is entirely enclosed. Elastic cords are provided to yieldingly fasten the skid bar and frame together.

A landing gear characterized as above briefly disclosed is exceptionally compact, unusually strong, and especially suited to machines designed for high speed flight. Other advantages and improved results will be hereinafter pointed out. The invention, however, is defined by the claims and not by the specification.

In the drawings, hereto attached:

Fig. 1 is a front end elevation of the landing gear.

Fig. 2 is a section on the line 2—2 of Fig. 1.

Fig. 5 is a section on the line 5—5 of Fig. 4.

Fig. 6 is a part section and part elevation of the cross connection between the landing gear struts showing the manner in which the axle sections are pivoted.

Fig. 7 is a section on the line 7—7 of Fig. 6.

Fig. 8 is a perspective view of the metal parts (detached) which together constitute the enclosure for the shock absorber mechanism.

Fig. 9 is a perspective view of the saddle carried by one of the axle sections.

Fig. 10 is a perspective view of the fairing carried by the axle.

Fig. 11 is a perspective view of the stool-support for the reaction elastic.

Fig. 12 is a perspective view of the clip provided at the foot of the strut.

Figure 3:
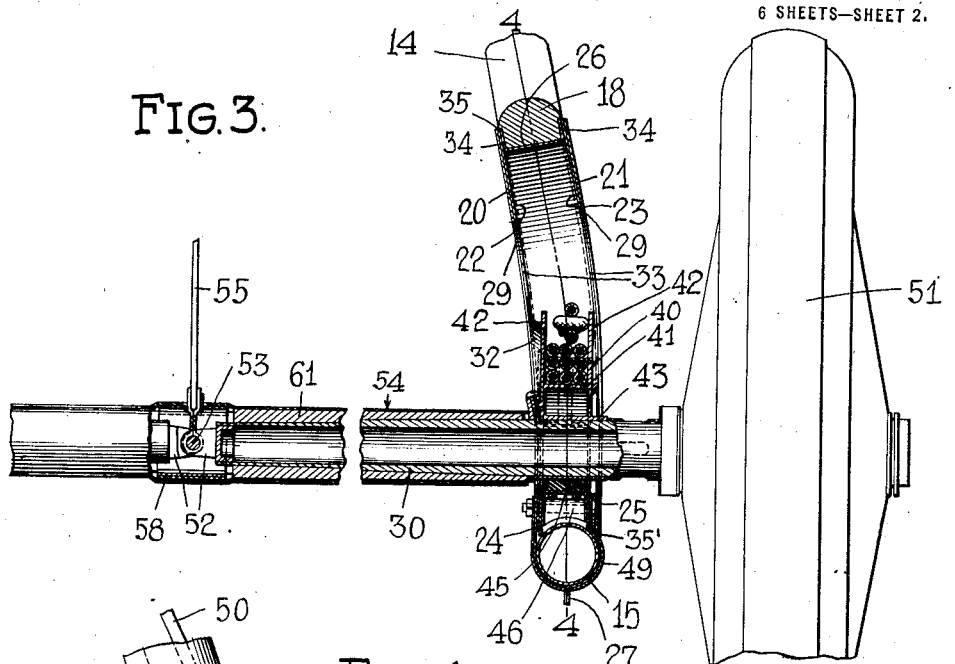
Fig. 3 is a transverse vertical section of the connection between one of the axle sections and its associated landing gear strut.

In the embodiment of the invention selected for illustration the fuselage or body of the craft is designated as 10, the longerons thereof as 11, and the diaphragms beneath which the landing gear struts are fastened as 12 and 13 respectively. The landing gear struts, of which there are two, are designated as 14. Each strut comprises a metal tube bent intermediately of its ends substantially V-shaped. The bend in each strut will be hereinafter referred to as the bight portion and is designated as 15.

To decrease the resistance which the struts 14 would otherwise offer fairing 16 and 17 is provided. The fairing 16 is coextensive with the forward leg of each strut and the fairing 17 coextensive with the rear leg thereof. Adjacent the bight portion 15 of each strut the fairing 16 is rearwardly enlarged as at 18 to provide a filler within and at the apex of the angle of the V strut, the filler, as indicated in Figure 2, being shaped to fill in the space both fore and aft of housing 19 provided at the foot of each strut.

In referring to Figure 8 it will be noted that the housing 19 for each strut comprises a plurality of metal parts. The width of the housing, when such parts are assembled is approximately equal to the thickness of the struts, and since the shock absorber mechanism hereinafter more particularly referred to, is completely enclosed within the confines of the housing it is obvious such mechanism offers a minimum of resistance. Although designated as an entirety by the numeral 19 each housing includes a pair of outer housing or cover plates 20 and 21, inner plates 22 and 23, attaching plates 24 and 25, and a connecting plate 26. The outer or cover plates 20 and 21 are shaped along their bottom edges to complement the curved portions of the V-strut. Each of said cover plates is provided with a curved outwardly extending flange 27 to admit of the attachment of the plates by bolts or screws 28 which penetrate the abutting flanges.

In addition to the flanges 27, the plates 20 and 21 are each provided with a vertical slot 29. These slots constitute guide slots for the landing gear axle 30. The slots are directly opposite and sufficiently elongated to permit vertical displacement of the axle 30 in landing. Along the leading or forward edge of each slot a wearing plate 31 is fastened. Accordingly as the axle 30 is displaced the wearing plates receive the wear rather than the thin metal of the housing plates 20 and 21.

Figure 4:
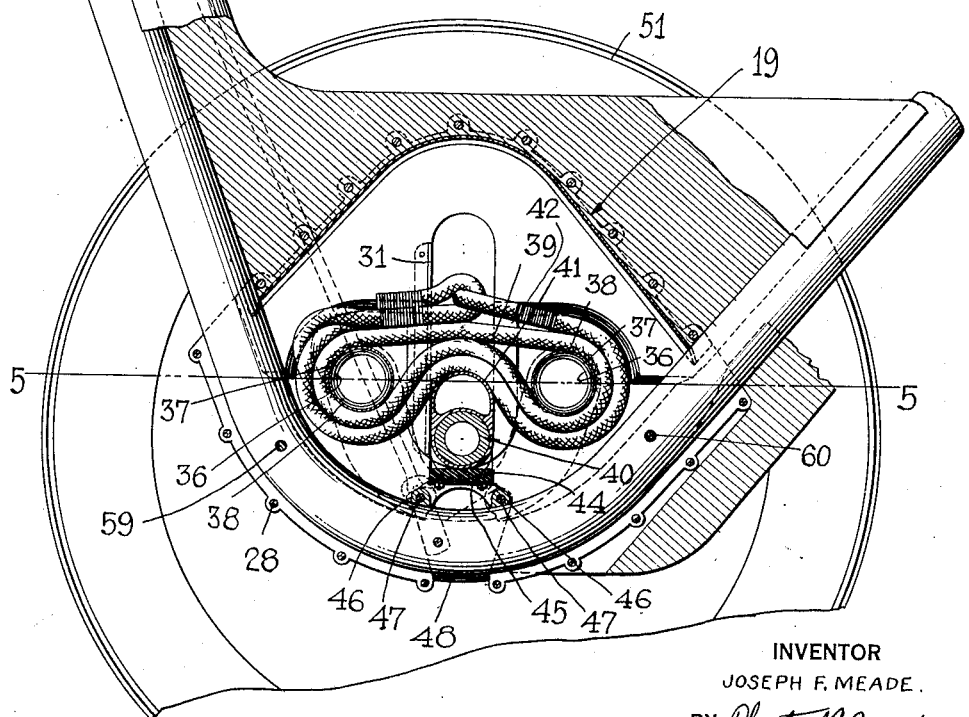
Fig. 4 is a section on the line 4—4 of Fig. 3.
Figure 13:
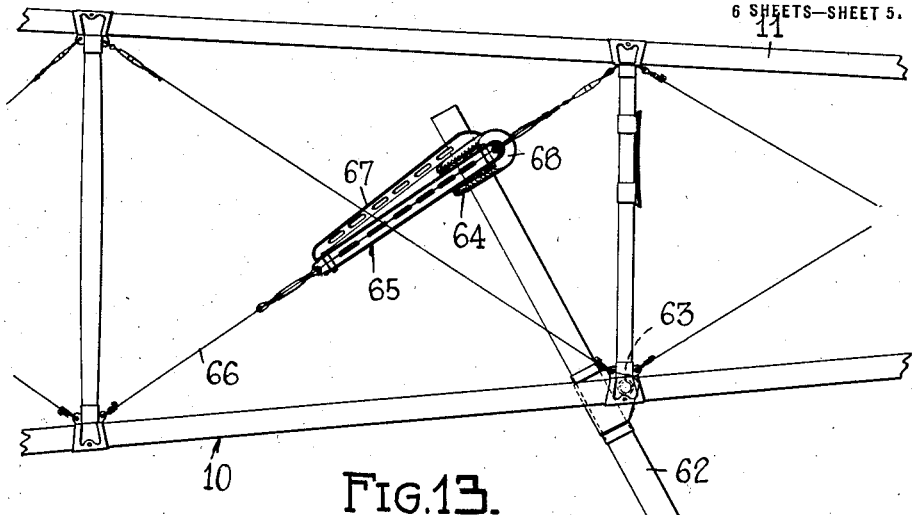
Fig. 13 is a side elevation of the tail skid showing its relation to the fuselage or body.
Figure 14:
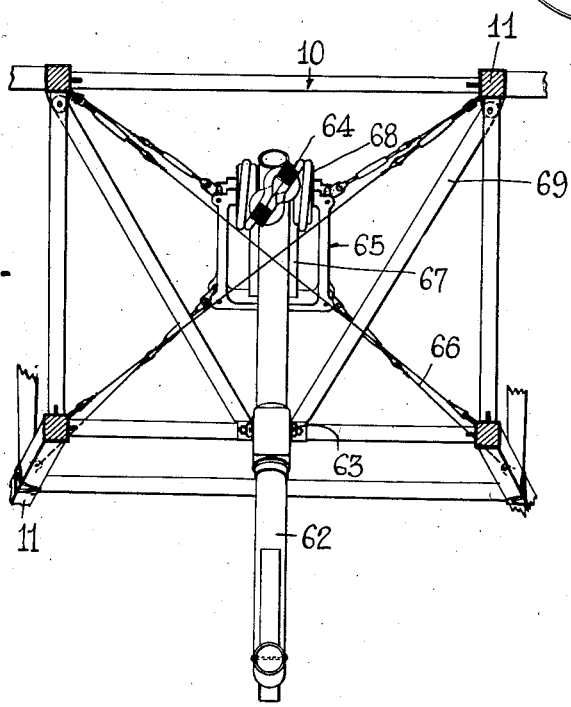
Fig. 14 is a rear end elevation of the tail skid, the fuselage being shown in transverse section.
Figure 15:
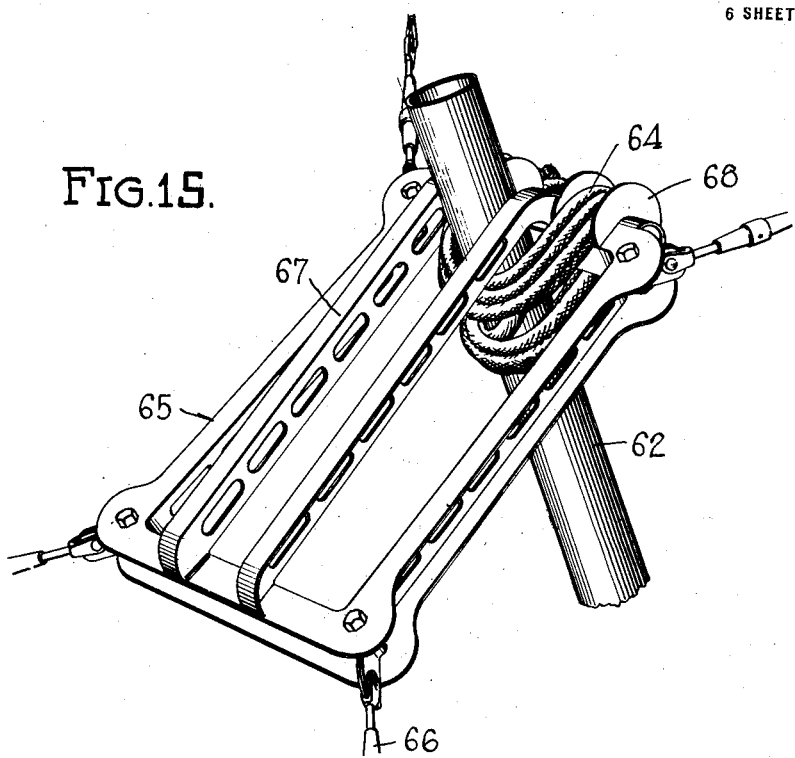
Fig. 15 is a perspective view of the shock absorbing connection between the tail skid and the combined frame and guide.
Figure 16:
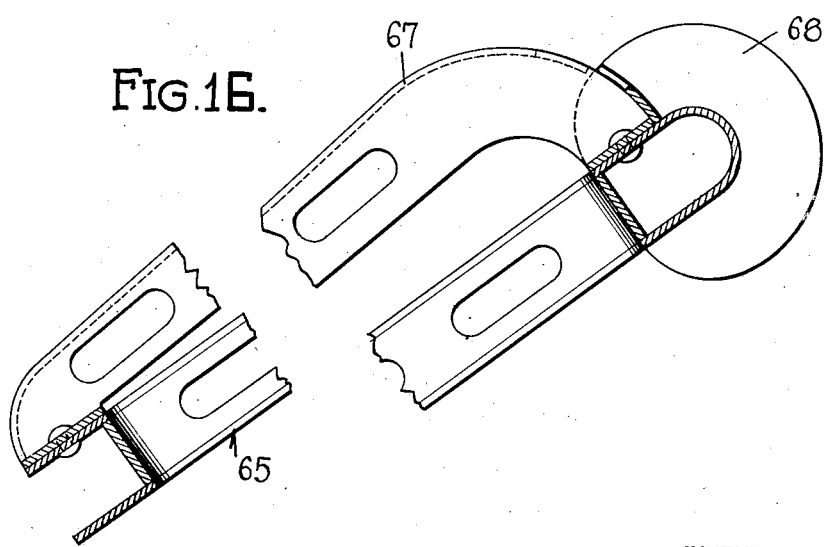
Fig. 16 is a longitudinal sectional view of the combined frame and guide.

The inner plates 22 and 23 of the housing, unlike the outer plates 20 and 21 do not extend beneath the struts. Each of said plates, throughout substantially its lower half, is laterally or rather inwardly depressed as indicated at 32. These depressed portions, (see Figure 4), accommodate the attaching plates 24 and 25. Like the cover plates 20 and 21, the inner plates 22 and 23 are also provided with guide slots 33 within which the axle 30 is movable. The slots 33 however extend clear to the bottom edge of the plates 22 and 23 whereas the slots 29 of the plates 20 and 21 terminate short of the bottom edge. This is because of the fact that the cover plates 20 and 21 are carried beneath the bight portion of the struts while the plates 22 and 23 rest directly upon and within the bight of the V. The plate 26 merely provides a connection between the plates 22 and 23. By flanging the plate 26 as indicated at 34 and by providing ears 35 along the top curved edges of the plates 22 and 23 the three plates can be bolted together.

The attaching plates 24 and 25 which fit within the depressed portions 32 of the plates 22 and 23, like the struts 14, are substantially U-shaped or V-shaped. These plates extend beneath the axle 30 and vertically upwardly upon opposite sides thereof and are fastened to the V-struts in a manner hereinafter more fully explained. The outside attaching plate 25, as distinguished from the plate 24, is flanged as indicated at 35′. Said flange extends laterally or outwardly toward the cover plate 21 to space said plates 24 and 25 apart. Such space is desirable in view of the bend in the V-strut just above the axle. Otherwise the movable parts confined to the housing 19 might have a tendency to bind when the axle 30 is displaced. The plates 24 and 21 being on the inside are not required to be spaced.

At the ends of the plates 24 and 25 and at points both fore and aft of the axle, flanges 36, together with similar flanges 37 formed on the plates 22 and 23 and sleeves 38 carried jointly by the mating flanges, provide supports or anchorages for shock absorber elastics 39. The flanges 36 extend inwardly from the plates 24 and 25 to fit snugly within the flanges 37 formed on the plates 22 and 23. Jointly said flanges 36 and 37 carry the sleeves 38 which in turn provide rounded bearing surfaces for the elastics. Such an arrangement is advantageous in that the supports for the elastics are doubly supported. Since the plates 22 and 23 rest directly upon the V-struts and since the plates 24 and 25 are fastened to the V-struts it is apparent that all possibility of the supports yielding under pressure due to operating stresses is eliminated.

To prevent interfriction between the elastic strands and the plates 22 and 23 between which the strands are laced the axle 30 is provided with saddles 40 at its points of intersection with the housing 19. The saddles 40 are fastened by any suitable means to the axle 30 and are provided with rounded bearing surfaces 41 over which elastics 39 are trained. The elastics it will be noted twice intersect the saddle and at points respectively fore and aft of the axle encircle the supports. In this way the full strength of the elastics is utilized. Moreover, the elastics, by reason of their fore and aft disposition within the housings admit of a compact arrangement of the related parts.

At both sides of each saddle 40 upstanding flanges 42 are provided. These flanges, no matter what the position of the axle, prevent interfriction between the elastics and the plates. In addition to the flanges 42, collars 43 are provided at opposite sides of the saddles to take up the wear and interfriction between the axle 30 and the plates 31 which reinforce the forward edges of the guide slots in the cover plates.

Beneath the axle, and likewise within the housings 19, reaction elastics 44 are disposed. These elastics are supported upon stools 45 especially designed for the purpose. Each stool (see Figure 11), is provided with legs 46 which straddle and rest upon the bight portions of the V-struts. They are fastened in place by bolts 47 which serve jointly as the fastening means for the U-plates 24 and 25. These bolts in addition provide a fastening means for a U-shaped clip 48 fitted beneath the bight portion of each V-strut. Said clip (see Figure 3) on the inside of each strut extends without the housing and on the outside of each strut is carried beneath the housing, depressions 49 being formed in the outer cover plates 21 of the housings for that purpose. The clips, in addition to their function as fastening means for the plates 24 and 25, also provide fastening means for wiring 50 cross-arranged between the landing gear struts. Said wiring at the lower ends of the crossed wires is directly fastened to the clips 48.

In contradistinction to the more or less conventional landing gear axle the axle herein comprises separate axle sections. These sections are joined together mid-way the ends of the axle as indicated in Figure 6.

By providing separate axle sections the wheels of the landing gear designated as 51 may yield independently.

At the inner ends of the axle sections ears 52 are formed. These ears are penetrated by a pivot bolt 53 supported jointly by a cross connection 54 between the landing gear struts and a wire 55 suspended from the under surface of the fuselage or body. The cross connection 54 comprises a forward cross-brace 56 and a rear cross-brace 57, said braces being fastened together centrally of the cross-connection by a metal strap 58 through which the pivot 53 passes. The braces 56 and 57 are in turn braced by tie-rods 59 and 60 which likewise cross-connect the landing gear struts as indicated in Figure 1. The tie-rods penetrate and are fastened to the V-struts as indicated at 57'.

Between the cross-braces 56 and 57 the axle sections normally lie. Together the cross-braces and the axle sections constitute a cross connection of good streamline form. In the interest of minimum weight the axle sections of the landing gear axle gradually increase in cross sectional area from their inner ends out since it is at the outer ends only that maximum strength is needed. By the use of fairing 61 throughout substantially the full length of axle sections the structure of the cross-connection, in the attainment of a streamline section, is much simplified.

In use, either or both wheels 51 of the landing gear may be vertically displaced. This displacement is strongly resisted by the elastics 39. The supports for the elastics 39 it will be noted are disposed respectively fore and aft of the axle and the supports and elastics both compactly enclosed within the bight portions of the V-struts to offer thereby a very minimum of head resistance. The width or thickness of the housing at the foot of each strut is substantially the same as the thickness of the struts themselves and since the latter are reduced in thickness to the utmost by the use of metal it is quite apparent that the structure disclosed is compact and desirable in the extreme.

With reference to tail skid of the landing gear (see Figures 13 to 16 inclusive) the skid bar 62 may be described as of more or less conventional design. For a portion of its length it is enclosed in the body of the machine and throughout substantially its full length is inclined upwardly and forwardly from its ground engaging end. Intermediately of its ends, preferably in the horizontal plane of the lower longerons of the fuselage it is pivoted as at 63, the pivot axis extending transversely of the machine that the skid bar may be vertically displaced. At its inner forward end the skid bar 62 is fastened by elastic cords 64 to a combined frame and guide 65. Said frame is preferably constructed of metal, suitably lightened, and is rectangular. At its respective four corners it is fastened to the fuselage by wires or cables 66. These cables are inclined forwardly and downwardly from the rear and constitute the ordinary bay wires of the fuselage.

Centrally the frame 65 is provided with a longitudinally extending guide slot 67 through which the inner forward end of the skid bar 62 passes. Normally the skid bar is held by the elastics 64 against one end of the frame 65 and at the upper rear end of the guide slot 67. As pressure is brought to bear on the skid bar from beneath however the elastics 64 yield and the skid bar accordingly travels in the guide way to an extent determined by the tension of the elastics and by the force applied to the skid. To hold the elastics in place flanges 68 are formed on the frame 65. Moreover, as a the vicinity of the tail skid diagonal braces 69 are provided. These braces diverge upwardly from points at or near the pivot 63 to the upper longerons. The feature of special novelty exhibited by the tail skid however is the suspension of the frame 65 by the fuselage wiring 66. Heretofore ridged devices other than the fuselage wiring have been used.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

I claim—

1. In a landing gear for aircraft, an axle, a strut extended beneath the axle, laterally spaced axle guides carried by the strut, shock absorbing elastics laced across the axle in a fore and aft direction to yieldingly resist its displacement, and supports for the elastics carried by the guides respectively in advance of and to the rear of the axle.

2. In a landing gear for aircraft, an axle, a strut extended beneath the axle, spaced axle guides mounted at the foot of the strut, shock absorbing elastics laced across the axle between the axle guides, and supports for the elastics carried jointly by the axle guides.

3. In a landing gear for aircraft, an axle, a V-strut extended beneath the axle, a housing mounted at the foot of the strut, the width of the housing being substantially equal to and not greater than the thickness of the strut, and shock absorbing mechanism enclosed in the housing and confined entirely in the space between the legs of the strut.

4. In a landing gear for aircraft, an axle, a V-strut formed of metal tubing bent intermediately of its ends, the bight of the V-strut being extended beneath the axle, a housing mounted at the foot of the V-strut to enclose the bight thereof, the width of the housing being not greater than the thickness of the strut, shock absorbing elastics enclosed in the housing and laced in a fore and aft direction between the legs of the V-strut, and supports for the elastics likewise enclosed in the housing and extended from one to the other of the longitudinal sides thereof, the supports being disposed respectively fore and aft of the axle.

5. In a landing gear for aircraft, an axle, a strut extended beneath the axle, shock absorbing elastics laced across the axle in a fore and aft direction to yieldingly resist its displacement, guide plates for the axle carried by the strut, and supports for the elastics cross-connecting the plates.

6. In a landing gear for air craft, an axle, a V-strut extended beneath the axle, shock absorbing mechanism yieldingly resisting displacement of the axle, plates carried by the V-strut, one on each side thereof, and supports for the shock absorbing mechanism cross-connecting the plates respectively fore and aft of the axle.

7. In a landing gear for aircraft, an axle, a strut extended beneath the axle, shock absorbing mechanism yieldingly resisting displacement of the axle, plates positioned respectively adjacent opposite faces of the strut, inturned flanges formed upon the respective plates, and cross-connections between the plates carried by the inturned flanges to support the shock absorbing mechanism.

8. In a landing gear for aircraft, an axle, a strut extended beneath the axle, shock absorbing mechanism yieldingly resisting displacement of the axle, plates positioned respectively adjacent opposite faces of the strut, supports for the shock absorbing mechanism cross-connecting the plates, and connections respectively between the plates and V-strut, each connection having means thereon to re-enforce the supports.

9. In a landing gear for aircraft, an axle, a V-strut extended beneath the axle, shock absorbing mechanism yieldingly resisting displacement of the axle, plates positioned respectively against opposite faces of the strut, supports for the shock absorbing mechanism cross-connecting the plates respectively fore and aft of the axle, connections respectively between plates and struts, and inturned flanges formed on the connections to re-enforce the supports.

10. In a landing gear for aircraft, an axle, a V-strut extended beneath the axle, shock absorbing mechanism confined to the space between the legs of the V-strut to yieldingly resist displacement of the axle, spaced plates carried by the V-strut, supports for the shock absorbing mechanism carried jointly between the plates, the supports being disposed respectively fore and aft of the axle, and means enclosing the plates, the shock absorbing mechanism and the supports.

11. In a landing gear for aircraft, an axle, a V-strut extended beneath the axle, shock absorbing mechanism yieldingly resisting displacement of the axle, and a combined axle-guide and housing enclosing the shock absorbing mechanism.

12. In a landing gear for aircraft, an axle, a V-strut extended beneath the axle, shock absorbing mechanism yieldingly resisting displacement of the axle, housing enclosing the shock absorbing mechanism, and a means to guide the axle when displaced, said means being formed by the provision of guide-slots in said housing.

13. In a landing gear for aircraft, the combination with the body, of wiring enclosed in the body, a frame enclosed in the body and supported by said wiring, a movable tail skid, and a yielding connection between the tail skid and the frame.

14. In a landing gear for aircraft, the combination with the body, of wiring enclosed in the body, a frame enclosed in the body and supported by said wiring, a movable tail skid, a guide for the tail skid carried by the frame, and a yielding connection between the tail skid and the frame.

In testimony whereof I hereunto affix my signature.

JOSEPH F. MEADE.